(12) United States Patent
Liu et al.

(10) Patent No.: US 9,333,980 B1
(45) Date of Patent: May 10, 2016

(54) ASSISTANCE DEVICE FOR CLIMBING STAIRS

(71) Applicants: Pao Pao Liu, Taichung (TW); Li-Heng Chang, Taichung (TW); Yu-Zen Tseng, Taichung (TW); Chin-Chia Liu, Taichung (TW)

(72) Inventors: Pao Pao Liu, Taichung (TW); Li-Heng Chang, Taichung (TW); Yu-Zen Tseng, Taichung (TW); Chin-Chia Liu, Taichung (TW)

(73) Assignee: FOOTWEAR & RECREATION TECHNOLOGY RESEARCH INSTITUTE, Taichung (TW)

( * ) Notice: Subject to any disclaimer, the term of this patent is extended or adjusted under 35 U.S.C. 154(b) by 0 days.

(21) Appl. No.: 14/586,774

(22) Filed: Dec. 30, 2014

(51) Int. Cl.
*B62D 51/04* (2006.01)
*B62B 5/02* (2006.01)
*B62B 1/12* (2006.01)

(52) U.S. Cl.
CPC .. *B62B 5/023* (2013.01); *B62B 1/12* (2013.01)

(58) Field of Classification Search
CPC ................................ B62B 5/023; B62B 1/12
USPC ...................... 280/5.2, 5.3, 5.32; 180/8.2–8.6
See application file for complete search history.

(56) References Cited

U.S. PATENT DOCUMENTS

| | | | | |
|---|---|---|---|---|
| 2,653,672 A * | 9/1953 | Wessie | ................ | B62B 5/023 180/8.2 |
| 3,788,413 A * | 1/1974 | Miller | ................ | B62B 5/023 180/8.2 |
| 5,141,240 A * | 8/1992 | Heilig | ................ | B62B 5/023 280/304.1 |
| 6,164,398 A * | 12/2000 | Alber | ................ | B62B 5/023 180/8.1 |
| 6,386,552 B1 * | 5/2002 | Bierma | ................ | B62B 5/023 180/8.2 |

* cited by examiner

*Primary Examiner* — Tony Winner (57) ABSTRACT

An assistance device includes a body having two wheels, and a pivotal device located in the body. Two transmission units are pivotably connected to the pivotal device by two shafts. A restriction unit includes a first link, a second link and a rail which is connected to the body. The first link has the first end pivotably connected to one of the two transmission units. The second link is pivotably connected to the other one of the two transmission units. A roller is connected to the first end of the second link and movable along the rail. A leg having a top end to which the second end of the first link is pivotably connected. The second end of the second link is pivotably connected between the top end and the lower end of the leg. The leg contacts against the ground to lift the body to climb stairs.

7 Claims, 13 Drawing Sheets

ASSISTANCE DEVICE FOR CLIMBING STAIRS

BACKGROUND OF THE INVENTION

1. Fields of the Invention

The present invention relates to an assistance device, and more particularly, to an assistance device for assisting disable persons to climb stairs.

2. Descriptions of Related Art

For disable persons or elders, to climb stairs is one of the difficult and inconvenient tasks for their everyday life. For some buildings, there are ramps built in front of the gate so that the disable persons or elders can be assisted to move along the ramps, however, some places may not have the ramps such as in a house. Although an elevator can send the disable persons or elders to a higher floors, the elevator is expensive and cannot be affordable for most of the families.

There is an assistance device developed which is cooperated with a wheel chair and includes an arm, and two rollers are connected to the two ends of the arm. The rollers are driving rollers so as to drive the wheel chair up onto the stairs. However, the assistance device tilts the wheel chair during operation and this may cause the person in the wheel chair to fall. Besides, there is a support device needed to support the wheel chair and the support device has to be cooperated with the driving rollers, this requirement makes the support device to be complicated. The support device is heavy and bulky, and is not convenient for carry.

The present invention intends to provide an assistance device to eliminate the shortcomings mentioned above.

SUMMARY OF THE INVENTION

The present invention relates to an assistance device and comprises a body having two wheels on two sides thereof, and a pivotal device is located in the body. Two transmission units each have a shaft and a transmission arm connected to the shaft. The two shafts pivotably connected to the pivotal device respectively. A restriction unit has a first link, a second link and a rail which is connected to the body. The first link has a first end pivotably connected to one of the two transmission units. The second link is pivotably connected to the other one of the two transmission units. A roller is connected to a first end of the second link and movable along the rail. A leg has a top end and a lower end. A second end of the first link is pivotably connected to the top end of the leg, and a second end of the second link is pivotably connected between the top end and the lower end of the leg.

Alternatively, another embodiment of the assistance device of the present invention comprises a body having two wheels on two sides thereof, and a pivotal device is located in the body. Two transmission units each have a shaft and a transmission arm connected to the shaft. The two shafts are pivotably connected to the pivotal device respectively. A restriction unit has a first link, a second link and a pivotal arm which has a first end connected to the body. The first link has a first end pivotably connected to one of the two transmission units. The second link is pivotably connected to the other one of the two transmission units. A second end of the pivotal arm is pivotably connected to a first end of the second link. A leg has a top end and a lower end, wherein a second end of the first link is pivotably connected to the top end of the leg, and a second end of the pivotal arm is pivotably connected between the top end and the lower end of the leg.

Preferably, each of the two transmission arms includes a force arm section and a pivotal section which extends perpendicularly from one end of the force arm section. The two pivotal sections of the two transmission arms are respectively and pivotably connected to the first and second links. The two pivotal sections of the two transmission arms are parallel to the shafts.

Preferably, the first link has a first force arm section and a first pivotal section which is pivotably connected to the leg. The second link has a second force arm section and a second pivotal section which is pivotally connected to the leg.

Preferably, the distance between the first pivotal section of the first link and the pivotal section of the transmission arm is equal to the distance between the second pivotal section of the second link and the pivotal section of the transmission arm. The force arm sections of the two transmission arms have the same length.

Preferably, a driving unit drives the transmission arms between a starting position, an ascending position and a returning position relative to the pivotal device. When the transmission arms are located at the starting position, the lower end of each of the wheels contacts the ground. The distance between the second pivotal section of the second link and the lower end of the leg is smaller than the distance between the second pivotal section of the second link and the ground. When the transmission arms are located at the ascending position, the lower end of the leg contacts the ground. The force arm section of the transmission arm pivots about the second pivotal section of the second link via the pivotal section of the transmission arm and lifts the body and the wheel away from the ground. When the transmission arms are located at the returning position, the wheels are located on the stair, the force arm section of the transmission arm pivots about the shaft and moves the leg away from the ground until the distance between the first pivotal section of the first link and the lower end of the leg is smaller than the distance between the first pivotal section of the first link and the stair.

Preferably, the driving unit includes a motor, and the pivotal device has a gear unit which is connected between the motor and the shaft. The motor drives the gear unit to pivot the shafts.

Preferably, the lower end of the leg is connected between two leg rollers.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the assistance device of the present invention comprises a body 1 which has two wheels 11 on two sides thereof. A pivotal device 2 is located in the body 1. Two transmission units 3 each have a shaft 31 and a transmission arm 32 which is connected to the shaft 31. The two shafts 31 are pivotably connected to the pivotal device 2 respectively.

A restriction unit 4 has a first link 41, a second link 42 and a rail 43 which is connected to the body 1. The first link 41 has a first end pivotably connected to one of the two transmission units 3, and the second link 42 is pivotably connected to the other one of the two transmission units 3. A roller 44 is connected to a first end of the second link 42 and movable along the rail 43.

A leg 5 has a top end and a lower end, wherein a second end of the first link 41 is pivotably connected to the top end of the leg 5, and a second end of the second link 42 is pivotably connected between the top end and the lower end of the leg 5.

Each of the two transmission arms 32 includes a force arm section 321 and a pivotal section 322 which extends perpendicularly from one end of the force arm section 321. The two pivotal sections 322 of the two transmission arms 32 are respectively and pivotably connected to the first and second links 41, 42. The two pivotal sections 322 of the two transmission arms 32 are parallel to the shafts 31. The first link 41 has a first force arm section 411 and a first pivotal section 412 which is pivotably connected to the leg 5. The second link 42 has a second force arm section 421 and a second pivotal section 422 which is pivotally connected to the leg 5. The distance between the first pivotal section 412 of the first link 41 and the pivotal section 322 of the transmission arm 32 is equal to the distance between the second pivotal section 422 of the second link 42 and the pivotal section 322 of the transmission arm 32. The force arm sections 321 of the two transmission arms 32 have the same length.

The assistance device further comprises a driving unit 6 which includes a motor 61. The pivotal device 2 has a gear unit (not shown) which is connected between the motor 61 and the shaft 31. The motor 61 drives the gear unit to pivot the shafts 31.

As shown in FIGS. 5 to 8, the driving unit 6 drives the transmission arms 32 between a starting position, an ascending position and a returning position relative to the pivotal device 2. The three positions are repeatedly operated as needed. When the transmission arms 32 are located at the starting position, a lower end of each of the wheels 11 contacts the ground "G". The distance between the second pivotal section 422 of the second link 42 and the lower end of the leg 5 is smaller than the distance between the second pivotal section 422 of the second link 42 and the ground "G". When the transmission arms 32 are located at the ascending position, the lower end of the leg 5 contacts the ground "G". The force arm section 321 of the transmission arm 32 pivots about the second pivotal section 422 of the second link 42 via the pivotal section 322 of the transmission arm 32 and lifts the body 1 and the wheel 11 away from the ground "G". The shafts 31 are simultaneously pivoted by the pivot device 2, so that the shafts 31 are always parallel with each other when pivoting. When the transmission arms 32 are located at the returning position, the wheels 11 are located on the stair "S", the force arm section 321 of the transmission arm 32 pivots about the shaft 31 and moves the leg 5 away from the ground "G" until the distance between the first pivotal section 412 of the first link 41 and the lower end of the leg 5 is smaller than the distance between the first pivotal section 412 of the first link 41 and the stair "S". In this embodiment, during the operation of the second link 42, the end that is restrictedly moveable within the rail 43 so as to limit the pivoting action of the second link 42, such that the shaft 31 moves the leg 5 to lift the body 1 and the rollers 11.

Figure 1:
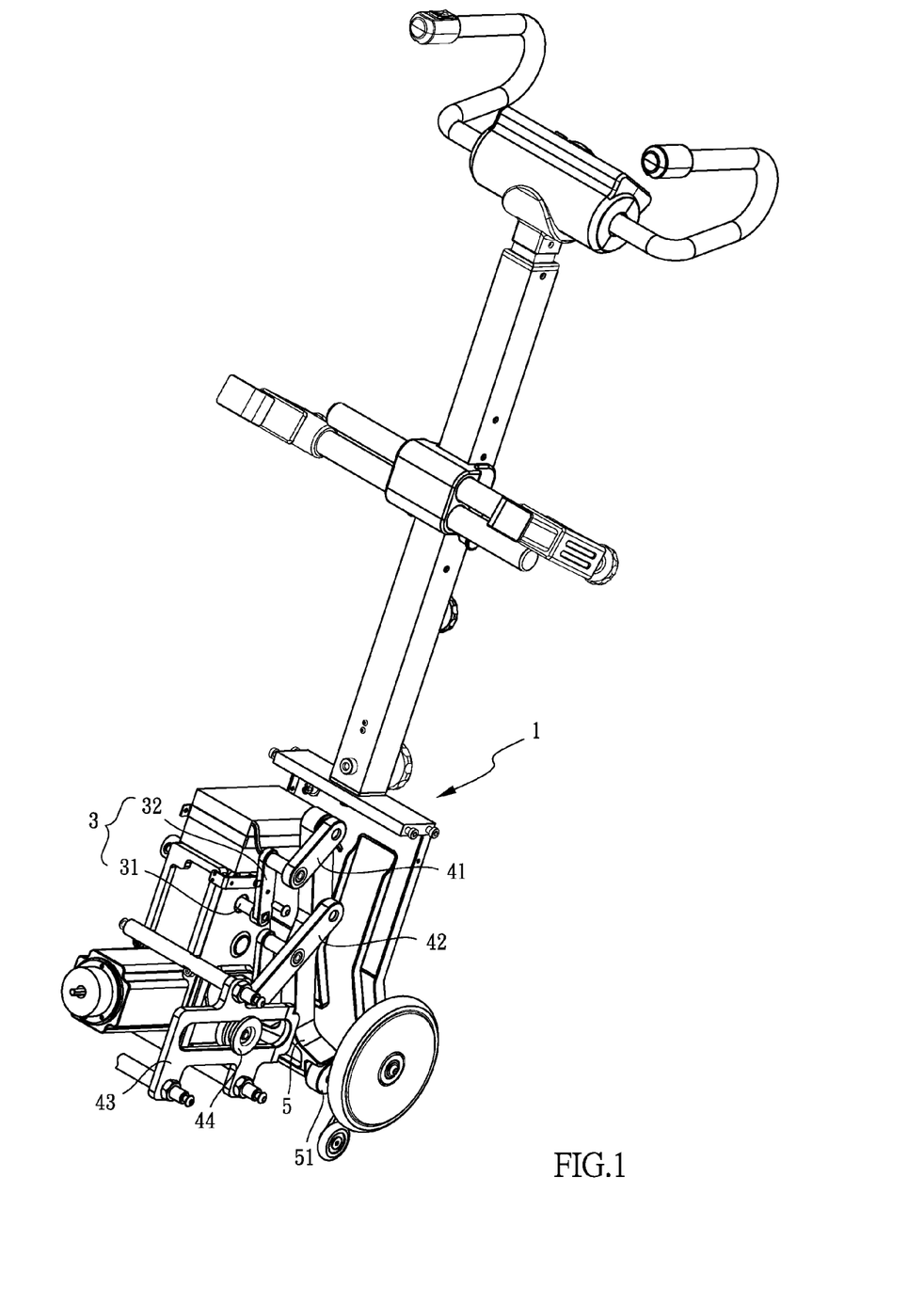
FIG. 1 is a perspective view to show the assistance device of the present invention.
Figure 2:
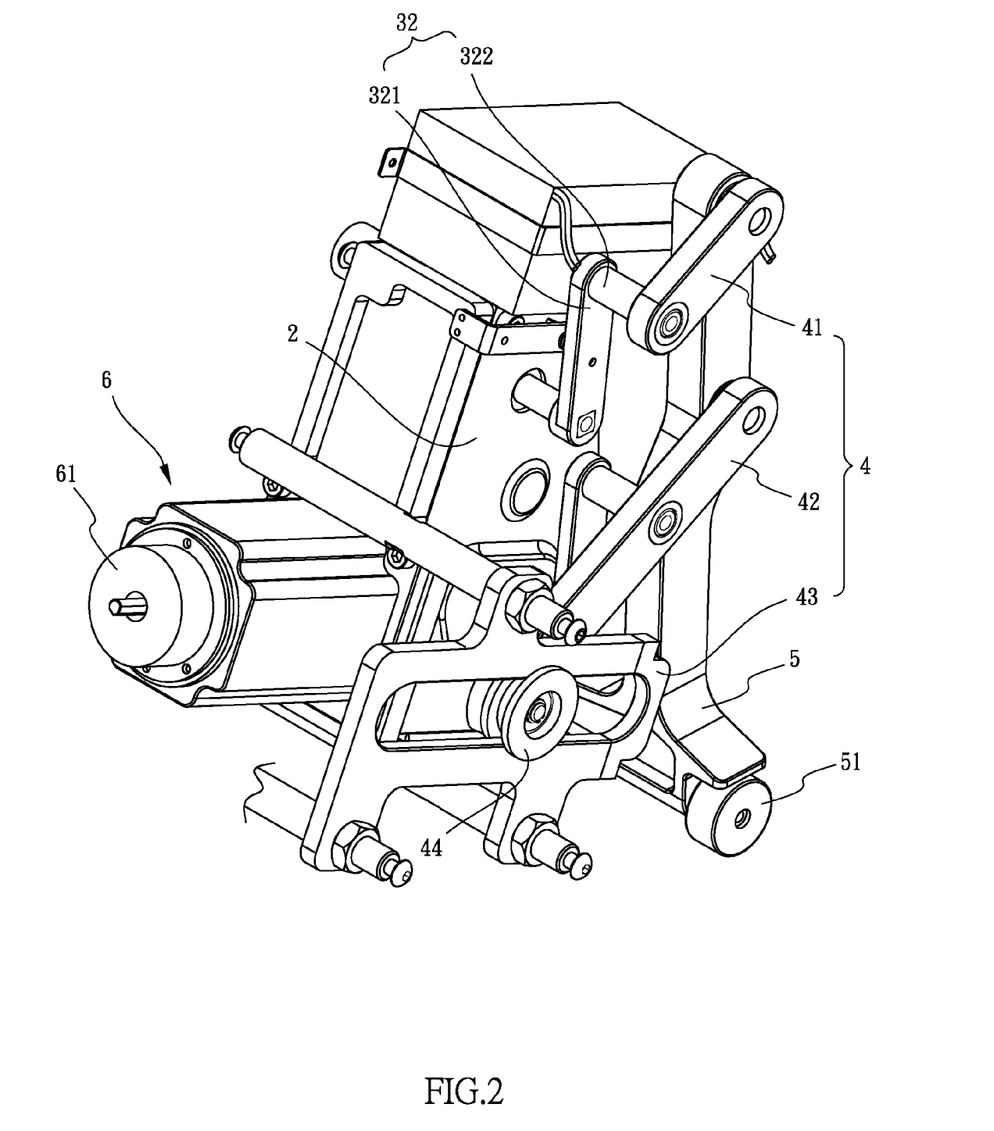
FIG. 2 is a perspective view to show a portion of the assistance device of the present invention.
Figure 3:
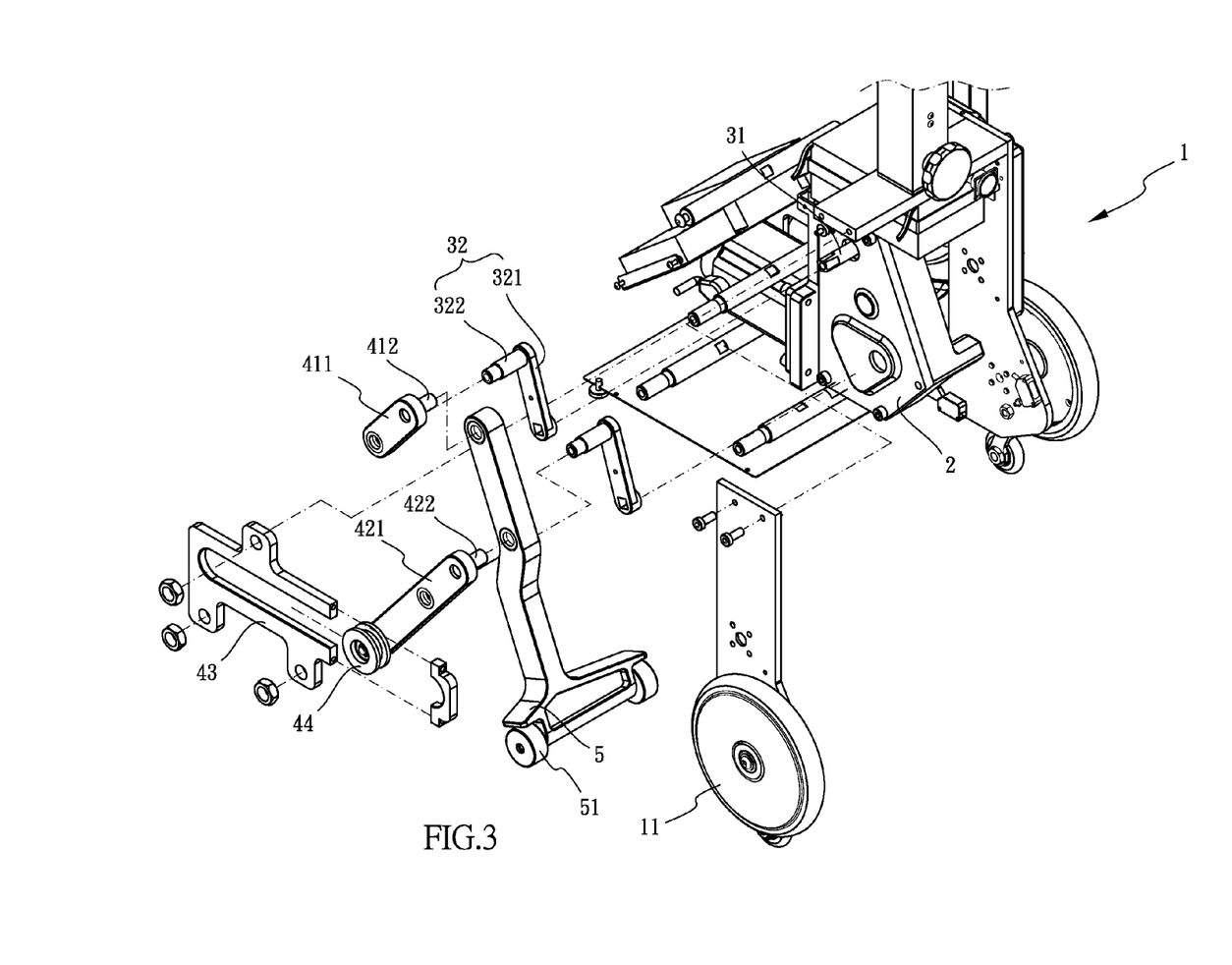
FIG. 3 is an exploded view to show a portion of the assistance device of the present invention.
Figure 4:
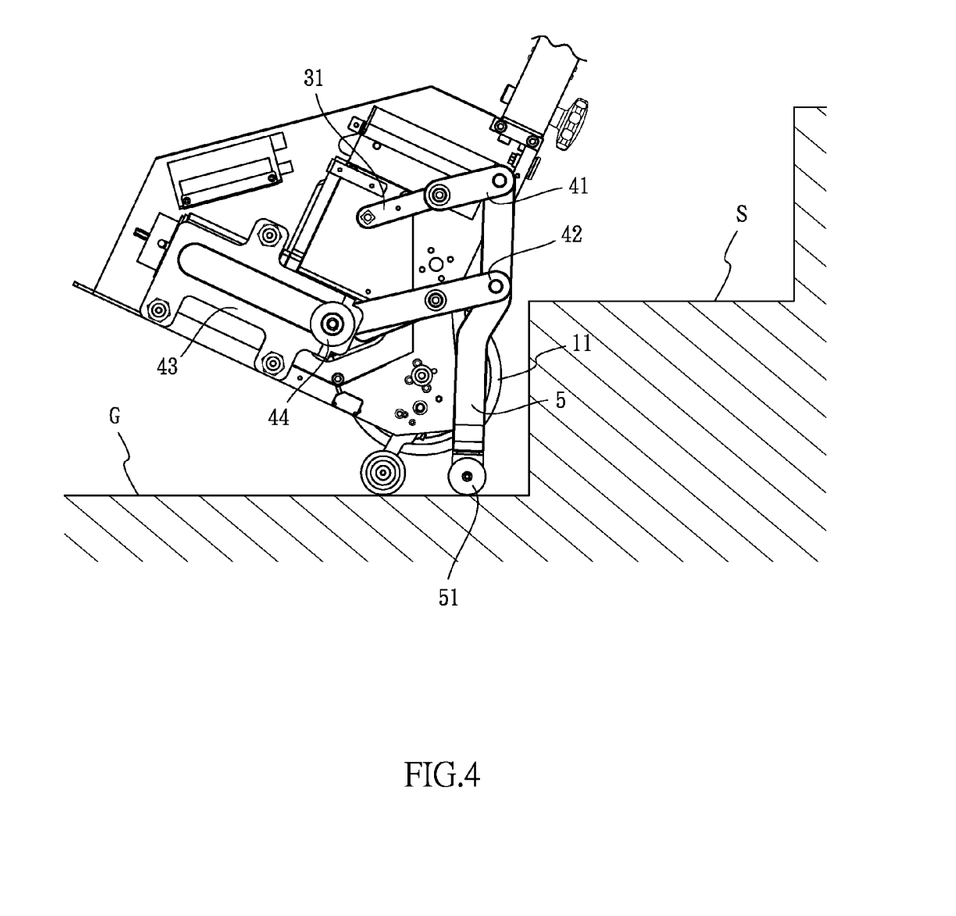
FIG. 4 shows that the assistance device of the present invention is located at the starting position.
Figure 5:
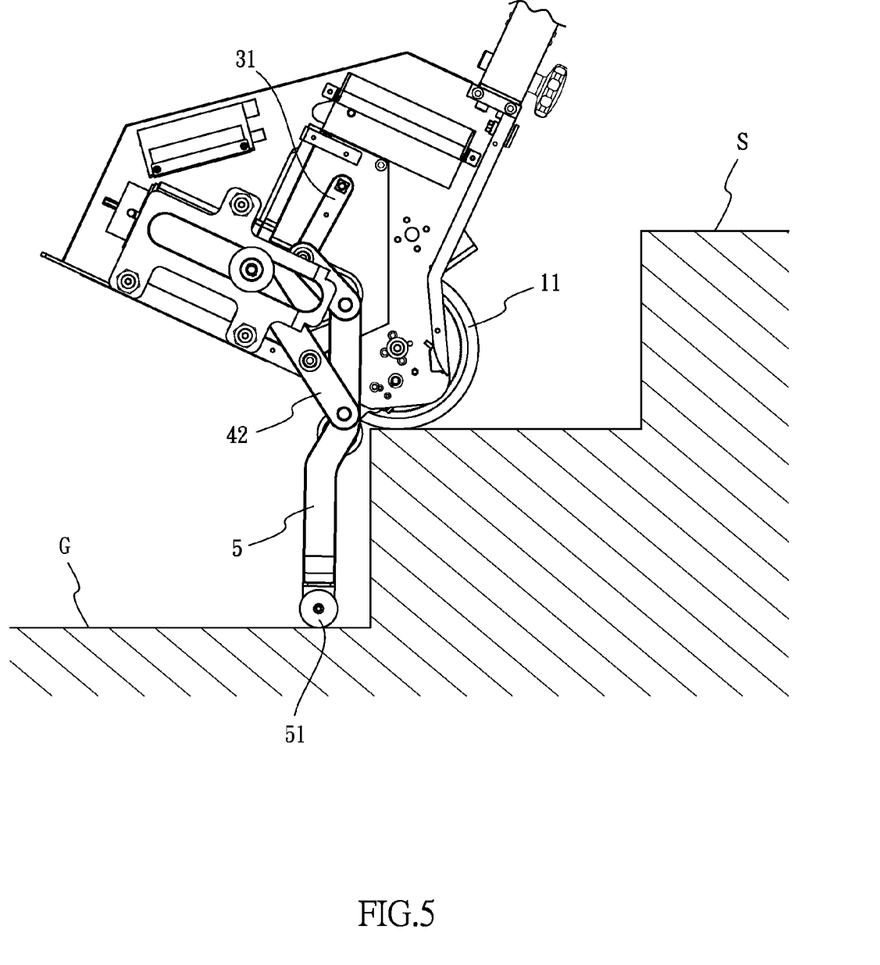
FIG. 5 shows that the assistance device of the present invention is located at the ascending position.
Figure 6:
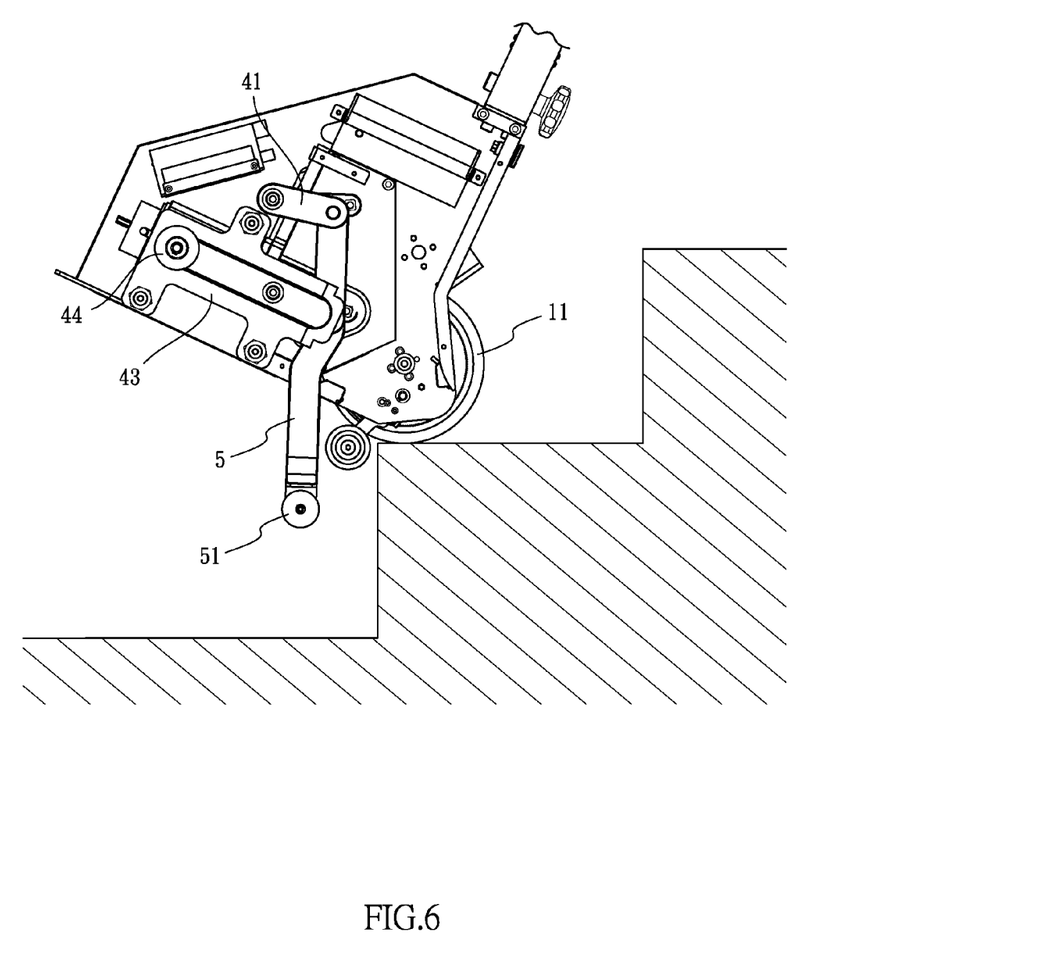
FIG. 6 shows that the assistance device of the present invention is located at the returning position.
Figure 7:
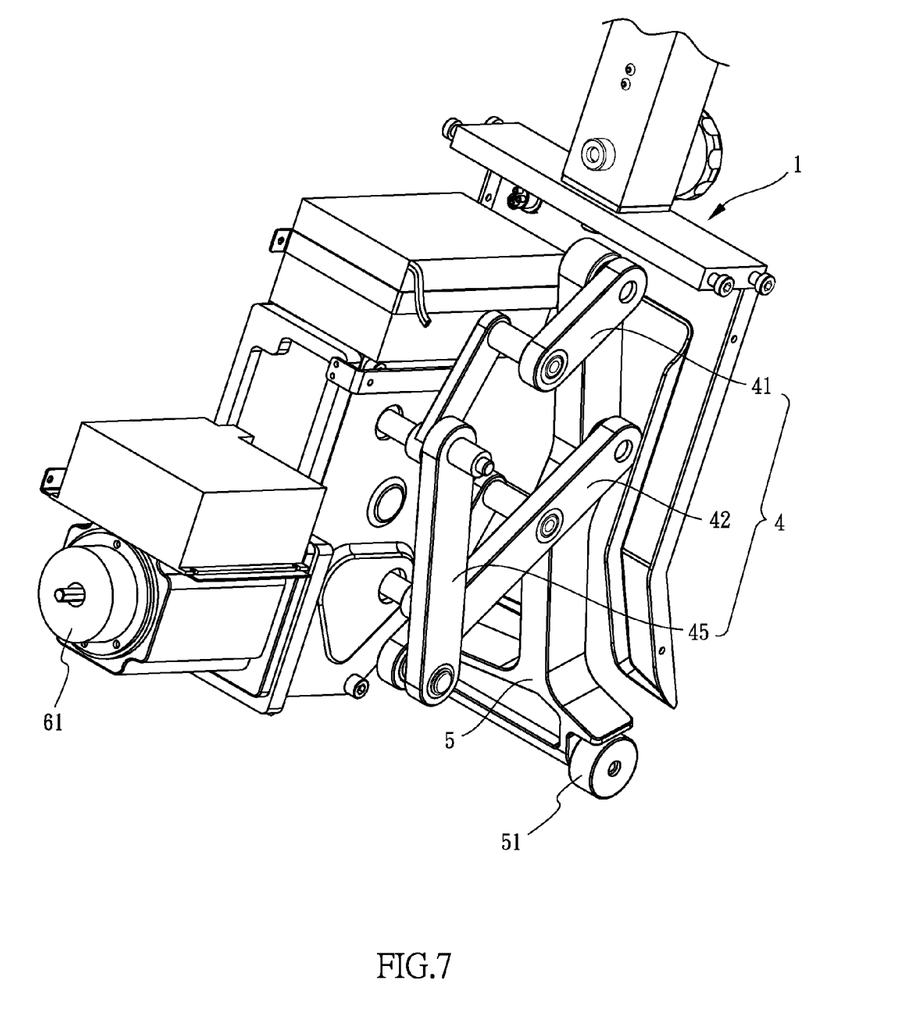
FIG. 7 is a perspective view to show a portion of the second embodiment of the assistance device of the present invention.
Figure 8:
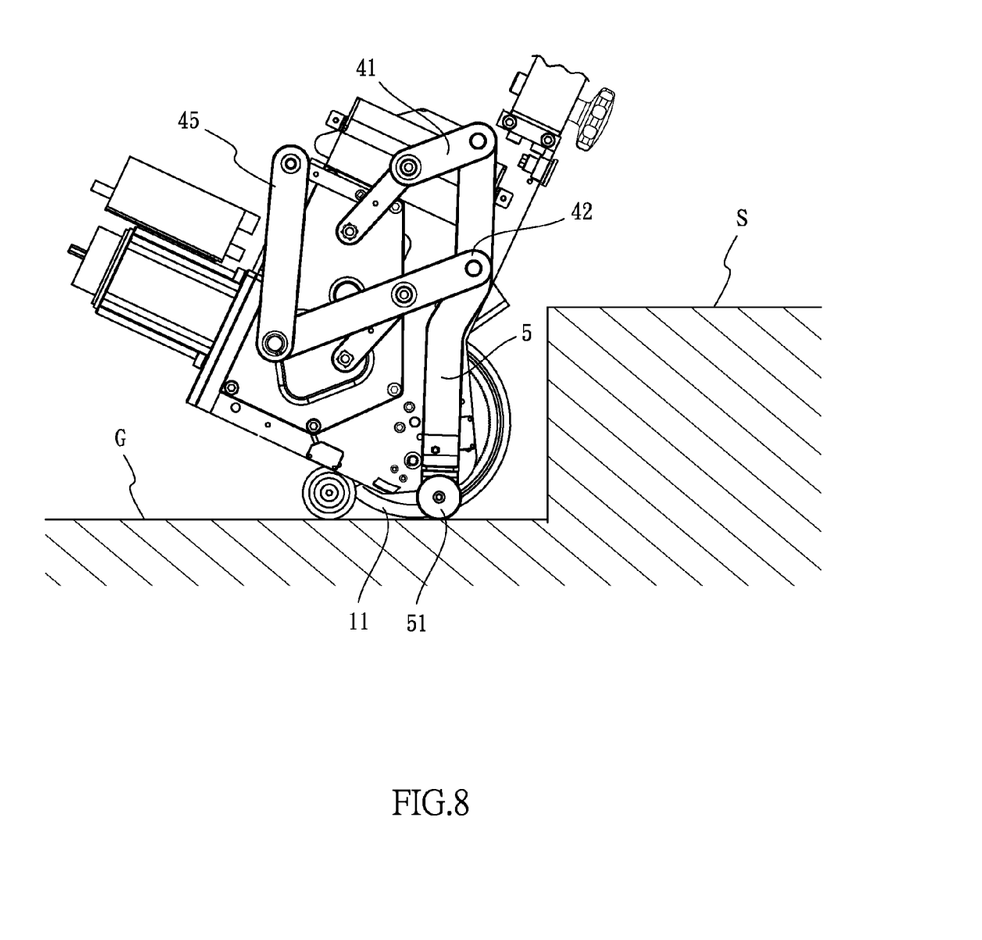
FIG. 8 shows that the second embodiment of the assistance device of the present invention is located at the starting position.
Figure 9:
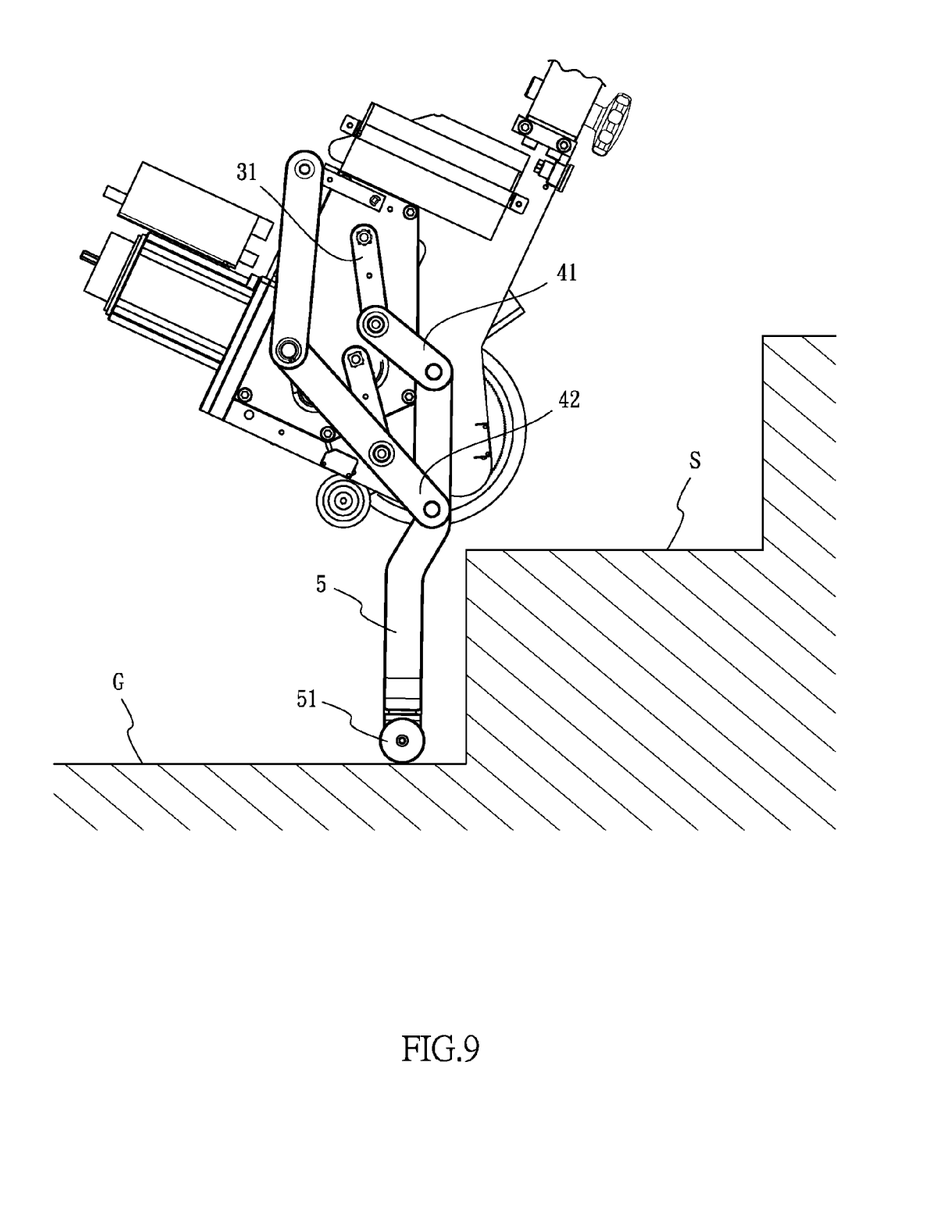
FIG. 9 shows that the second embodiment of the assistance device of the present invention is located at the ascending position.
Figure 10:
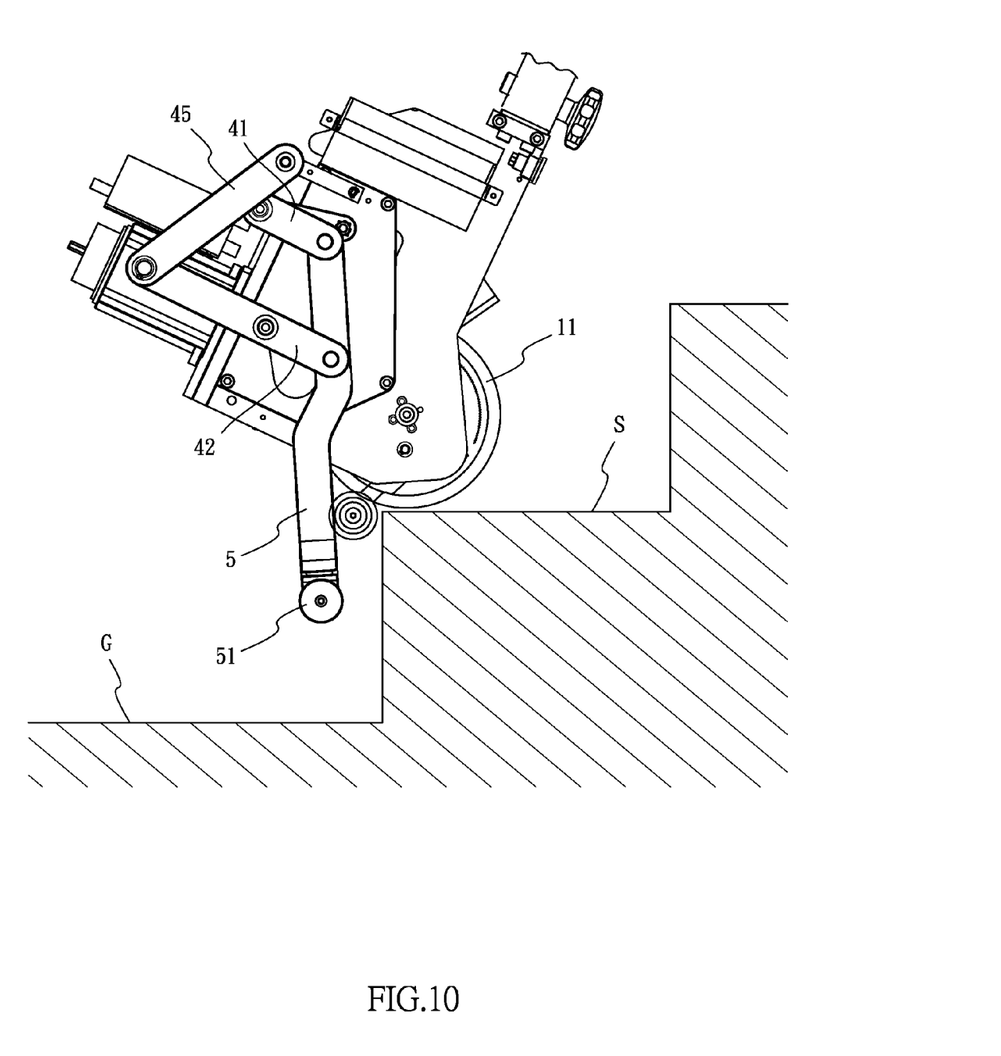
FIG. 10 shows the second embodiment of the assistance device of the present invention is located at the returning position.
Figure 11:
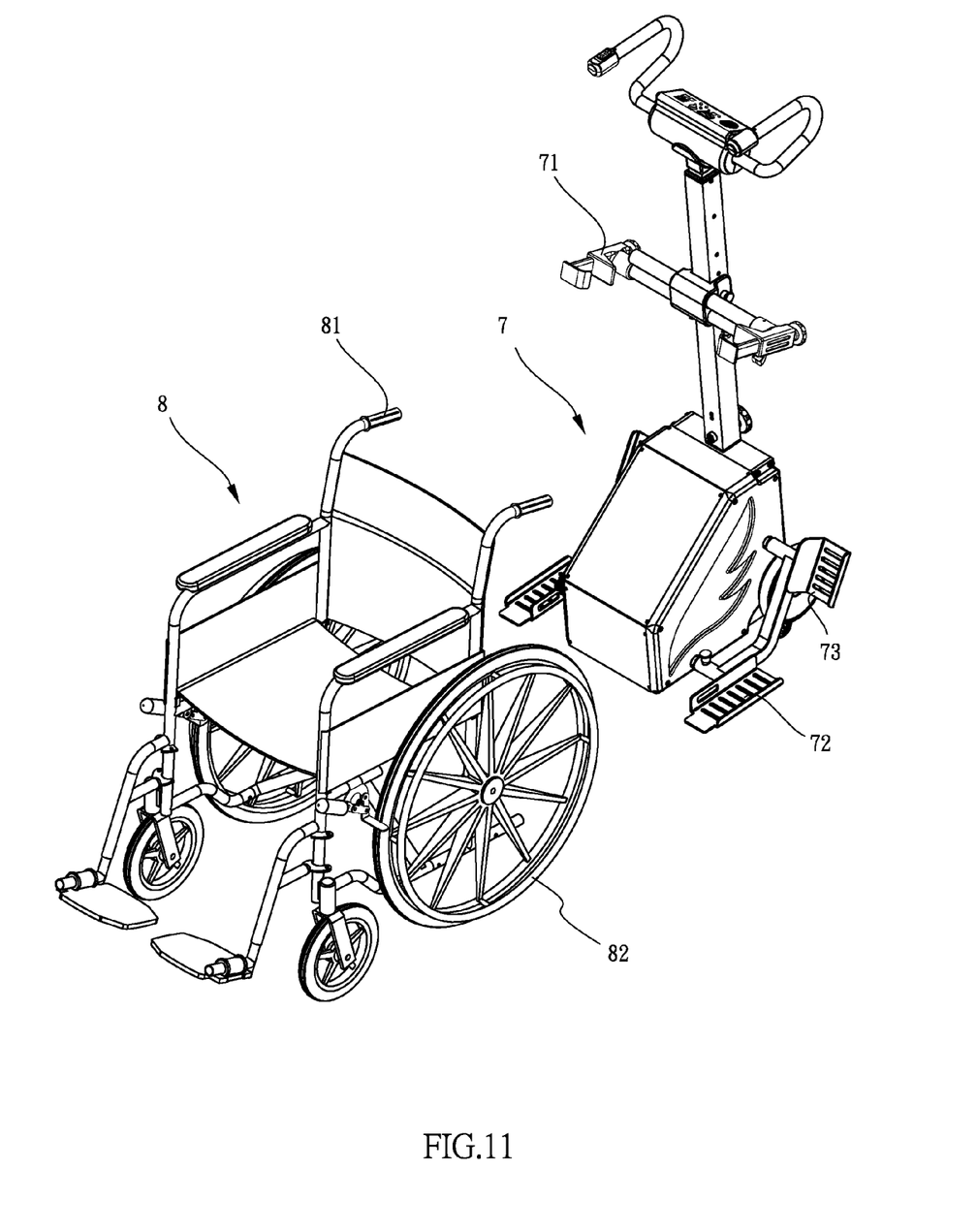
FIG. 11 shows the assistance device of the present invention and a wheel chair.
Figure 12:
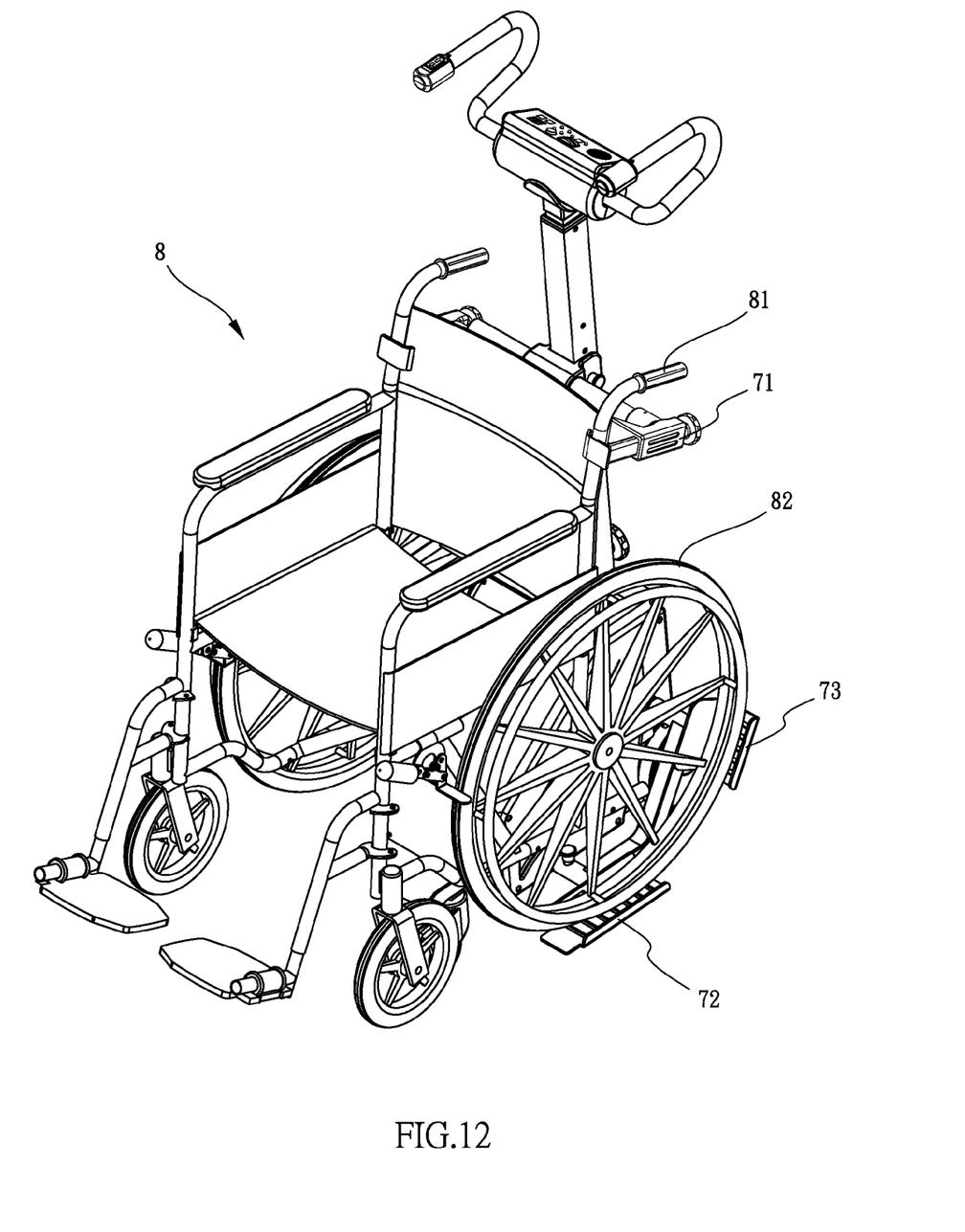
FIG. 12 shows that the assistance device of the present invention is engaged with the wheel chair.
Figure 13:
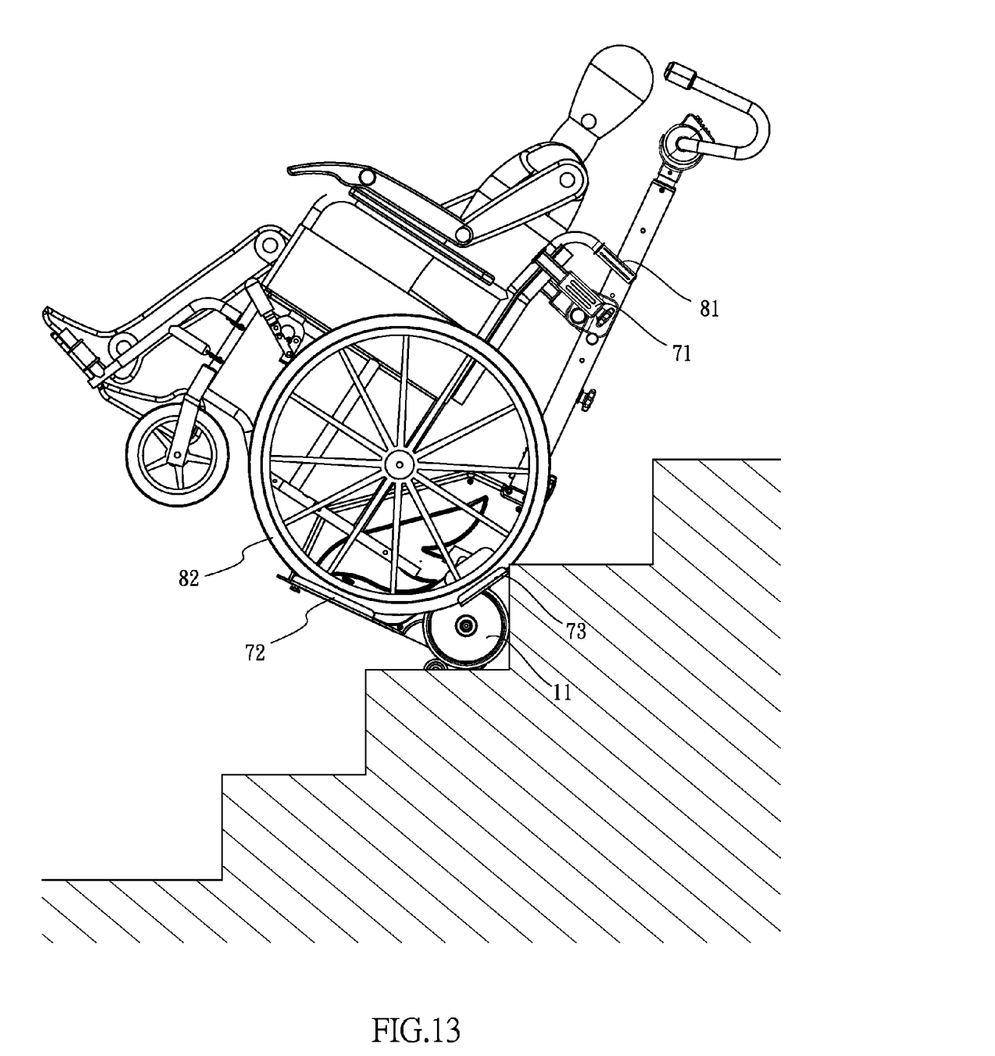
FIG. 13 shows that the assistance device of the present invention assists a person sitting in the wheel chair to climb stairs.

The assistance device of the present invention further comprises an engaging device 7 which has two side arms 71, two lower boards 72 and two rear boards 73. The two side arms 71 are connected to two bars on two sides of an upright column of the body 1. The two lower boards 72 are connected to two sides of the lower end of the body 1, and the two rear boards 73 are connected to two sides of the rear end of the body 1. An L-shaped link is connected between the lower board 72 and the rear board 73 of the same sides of the column. When in use, the wheel chair 8 is moved backward to allow the armrests 81 of the wheel chair 8 to be clamped between the two side arms 71, and the two wheels 82 of the wheel chair 8 are supported on the two lower boards 71 and leaned on the rear boards 73. Therefore, the wheel chair 8 is engaged with the assistance device of the present invention. Therefore, the person sitting in the wheel chair 8 does not need to be moved to another wheel chair.

As shown in FIGS. 9 to 12, the second embodiment of the present invention is disclosed, the differences from the first embodiment are that the restriction unit 4 comprises a first link 41, a second link 42 and a pivotal arm 45 which has a first end connected to the body 1. The first link 41 has a first end pivotably connected to one of the two transmission units 3. The second link 42 is pivotably connected to the other one of the two transmission units 3. A second end of the pivotal arm 45 is pivotably connected to a first end of the second link 42. The pivotal arm 45 can achieve the same function as does of the rail 43 of the first embodiment.

The assistance device of the present invention can also be used to carry heavy goods to climb stairs. A seat can be directly connected to the assistance device to assist a person to ascend to a higher position via stairs.

While we have shown and described the embodiment in accordance with the present invention, it should be clear to those skilled in the art that further embodiments may be made without departing from the scope of the present invention.

What is claimed is:

1. An assistance device comprising:
a body having two wheels on two sides thereof;
a pivotal device located in the body;
two transmission units each having a shaft and a transmission arm connected to the shaft, the two shafts pivotably connected to the pivotal device respectively;
a restriction unit having a first link, a second link and a rail which is connected to the body, the first link having a first end pivotably connected to one of the two transmission units, the second link pivotably connected to the other one of the two transmission units, a roller connected to a first end of the second link and movable along the rail, and a leg having a top end and a lower end, a second end of the first link pivotably connected to the top end of the leg, a second end of the second link pivotably connected between the top end and the lower end of the leg.

2. The assistance device as claimed in claim 1, wherein each of the two transmission arms includes a force arm section and a pivotal section which extends perpendicularly from one end of the force arm section, the two pivotal sections of the two transmission arms are respectively and pivotably connected to the first and second links, the two pivotal sections of the two transmission arms are parallel to the shafts.

3. The assistance device as claimed in claim 2, wherein the first link has a first force arm section and a first pivotal section which is pivotably connected to the leg, the second link has a second force arm section and a second pivotal section which is pivotally connected to the leg.

4. The assistance device as claimed in claim 3, wherein a distance between the first pivotal section of the first link and the pivotal section of the transmission arm is equal to a distance between the second pivotal section of the second link and the pivotal section of the transmission arm, the force arm sections of the two transmission arms have the same length.

5. The assistance device as claimed in claim 4, wherein a driving unit drives the transmission arms between a starting position, an ascending position and a returning position relative to the pivotal device, when the transmission arms are located at the starting position, a lower end of each of the wheels contacts a ground, a distance between the second pivotal section of the second link and a lower end of the leg is smaller than a distance between the second pivotal section of the second link and the ground, when the transmission arms are located at the ascending position, the lower end of the leg contacts the ground, the force arm section of the transmission arm pivots about the second pivotal section of the second link via the pivotal section of the transmission arm and lifts the body and the wheel away from the ground, when the transmission arms are located at the returning position, the wheels are located on the stair, the force arm section of the transmission arm pivots about the shaft and moves the leg away from the ground until a distance between the first pivotal section of the first link and the lower end of the leg is smaller than a distance between the first pivotal section of the first link and the stair.

6. The assistance device as claimed in claim 5, wherein the driving unit includes a motor, the pivotal device has a gear unit which is connected between the motor and the shaft, the motor drives the gear unit to pivot the shafts.

7. The assistance device as claimed in claim 6, wherein the lower end of the leg is connected between two leg rollers.

\* \* \* \* \*